Aug. 30, 1955 J. V. DAVIS ET AL 2,716,415

PLATING MACHINE

Filed Dec. 11, 1953 10 Sheets-Sheet 1

INVENTORS.
John V. Davis.
Chester G. Clark
BY
Harness, Dickey & Pierce.
ATTORNEYS.

Aug. 30, 1955 J. V. DAVIS ET AL 2,716,415
PLATING MACHINE
Filed Dec. 11, 1953 10 Sheets-Sheet 2

INVENTORS.
John V. Davis.
Chester A. Clark
BY
Harness, Dickey & Pierce
ATTORNEYS.

PLATING MACHINE

INVENTORS.
John V. Davis
Chester A. Clark
BY
Harness, Dickey & Pierce.
ATTORNEYS.

INVENTORS.
John V. Davis.
Chester G. Clark.
BY
Harness, Dickey & Pierce.
ATTORNEYS.

INVENTORS
John V. Davis
Chester G. Clark
BY
Harness, Dickey & Pierce
ATTORNEYS

PLATING MACHINE

Filed Dec. 11, 1953 10 Sheets-Sheet 6

INVENTORS.
John V. Davis
Chester G. Clark
BY
Harness, Dickey & Pierce
ATTORNEYS

Aug. 30, 1955 J. V. DAVIS ET AL 2,716,415

PLATING MACHINE

Filed Dec. 11, 1953 10 Sheets-Sheet 7

INVENTORS.
John V. Davis.
Chester G. Clark.
BY
Harness, Dickey & Pierce
ATTORNEYS.

INVENTORS.
John V. Davis
Chester G. Clark
BY
Harness, Dickey & Pierce.
ATTORNEYS INVENTORS.
John V. Davis.
Chester G. Clark.
BY
Harness, Dickey & Pierce
ATTORNEYS.

INVENTOR
JOHN V. DAVIS.
CHESTER G CLARK.

BY Harness, Dickey & Pierce
ATTORNEYS

United States Patent Office 2,716,415

Patented Aug. 30, 1955

2,716,415

PLATING MACHINE

John V. Davis, Grosse Pointe Farms, and Chester G. Clark, Detroit, Mich., assignors to The Udylite Corporation, Detroit, Mich., a corporation of Delaware Application December 11, 1953, Serial No. 397,507

13 Claims. (Cl. 134—76)

This invention relates to plating machines and more particularly to straight line automatic electroplating machines of the type in which a series of articles are conveyed on carriers through the machine from one end to the other and are removed from the carriers after being plated.

In conventional straight line automatic plating machines, the work carriers enter one end of the machine having a series of tanks which run the full length of the machine and the work travels from one tank to the next tank in an elevated position, and in the down position travels between rows of longitudinally disposed anodes to emerge from the plating bath at the opposite end of the machine. Such an arrangement permits only slight adjustments of the anodes to accommodate varied shaped parts in order to obtain uniform plating over the entire surface of the part. In the usual case where the part to be plated requires adjustment of the anodes, it is preferable and cheaper to plate the parts in a still tank with the parts disposed horizontally and the anodes disposed in nested relationship around the part even though it is necessary to move the plated parts by overhead hoists operated by a skilled plater.

It is an object of the present invention to provide a straight line plating machine of an improved nature which eliminates the disadvantages of previous devices of this type and results in a substantial saving of time and space when plating a plurality of workpieces simultaneously.

It is another object to provide an improved plating machine of the above nature in which means are provided for selectively lifting one or more of a plurality of workpieces from the plating bath, and allowing the workpieces which have not been fully plated to remain continuously in the plating bath until their removal time has arrived.

It is a further object to provide a plating machine of the above nature in which the fully plated workpieces are "skip transferred," that is, selectively and automatically removed from the plating station in any desired sequence, regardless of their relative longitudinal position in the plating station, and in which unplated workpieces are automatically transferred to those positions in the plating station vacated by plated parts.

It is also an object to provide a plating machine of the above nature in which the number and size of plating tanks, workpiece capacity, sequence of removal and plating time may be varied to suit individual requirements.

It is another object to provide a plating machine of the above character in which novel means are provided for preventing an unplated workpiece from stopping in a plating section which is unable to receive the workpiece, and which automatically halts the forward movement of a workpiece which has reached its proper position on the transfer track.

It is a further object to provide a plating machine of the above type in which the means for lifting and lowering the workpiece with respect to the plating bath also serves as part of the transfer track, thereby greatly simplifying the mechanism for effecting skip transfer of the articles being plated.

Other objects, features, and advantages of the present invention will become apparent from the subsequent description, taken in conjunction with the accompanying drawings.

In the drawings:

Figure 3 is a perspective view similar to Figure 2 but with the frame in the raised position and with the movable track sections held inwardly to form a continuous track;

Fig. 19 is a side elevation view, partly schematic, illustrating the chain pusher means for removing carriers from the plating station and bringing a replacement carrier into the vacated spot.

This invention represents an improvement on the invention disclosed in, and the broader aspects of which are claimed in, copending application Serial No. 397,506, filed December 11, 1953.

The present invention provides automatic apparatus which allows a rack of parts to remain at rest in a cell of the plating tank provided with a nest of conforming anodes for the time period required to produce the required deposit, and concurrently enables the most efficient utilization of preliminary tanks, such as cleaning and rinsing tanks, which require much shorter dwell periods of the part being plated than the plating cells. In general, this automatic cycle is accomplished by a plating station which is provided with means for selecting in sequence empty plating cells to accommodate work carriers as they emerge from the preliminary tanks, as is more fully described hereinbelow.

Figure 1:
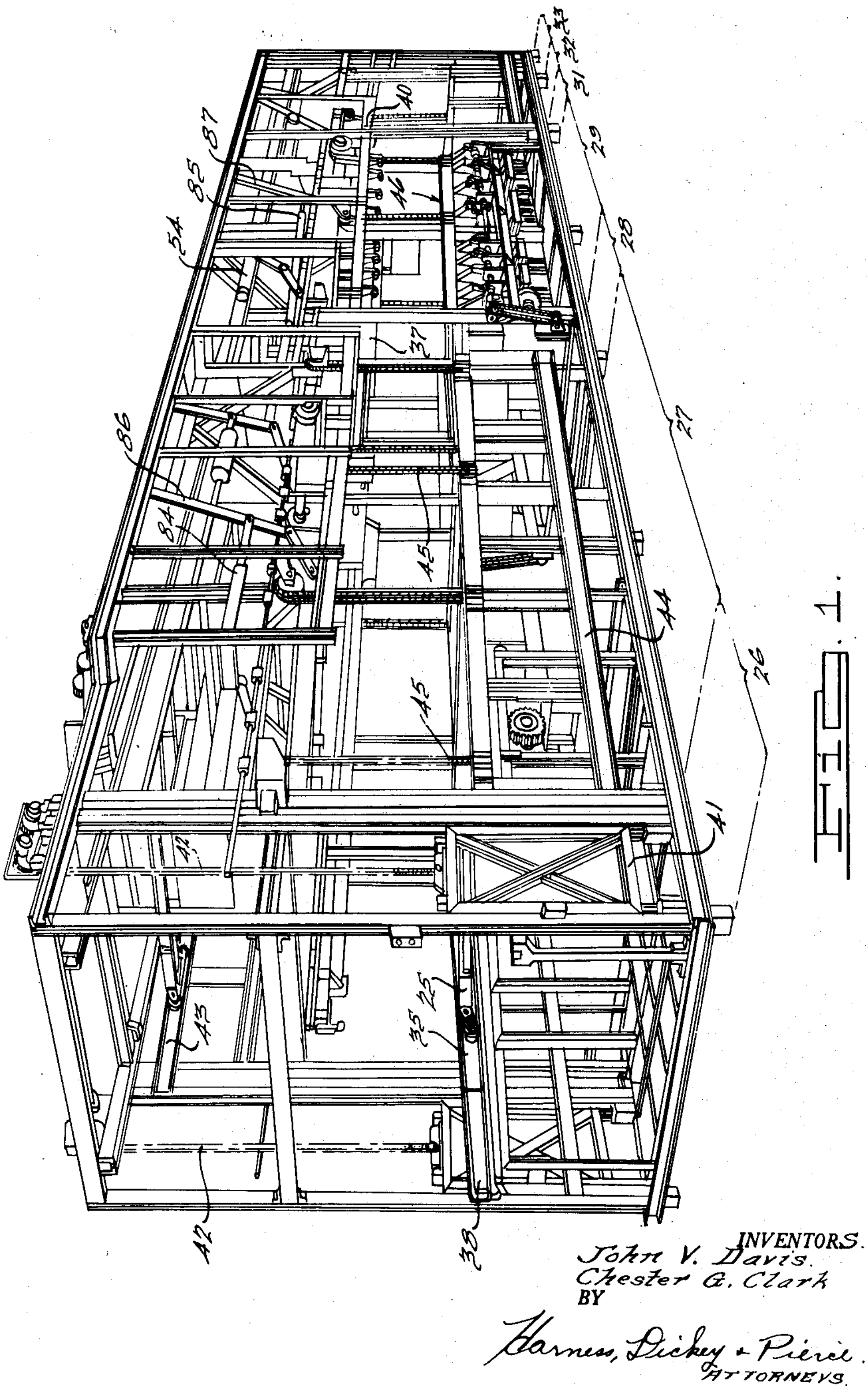
Figure 1 is a perspective view of a straight line plating machine with the tanks removed having included therein the principles of the present invention and showing the general location of the novel plating station with respect to the other portions of the machine.

The general arrangement and operation of the straight line plating machine embodying the present invention is perhaps best seen in schematic Figures 11 to 14. The machine includes a plurality of treatment tanks, three such tanks being shown in the present embodiment, namely a pretreatment tank 21, a plating tank 22 and a rinse tank 23. Plating tank 22, which is schematically indicated in Figures 11 to 14 is in the actual apparatus of this invention a segmented tank, the plurality of segments forming plating station 29 of Figure 1. In each of the segments of tank 22, the anodes are hung across the width of the machine in nests which conform to the shape of the part being plated, and it will be apparent that continuous forward travel through these tanks is impossible. It will be understood that the nature, number and capacity of the tanks could be varied from those shown and that the principles of the invention could be applied to other than the illustrated sequence of operations. The workpieces 24 are held by carriers 25 during their movement through the machine and into and out of the various tanks. These carriers travel along a pair of transfer tracks which extend the length of the machine and is made up of sections corresponding to the stations of the machine. Since the sequence of movement of the carriers is important in understanding the operation of the invention, each carrier in Figures 11 to 14 is given a separate reference numeral. Thus, in the figures, carriers 25*a* to 25*m* are marked.

The stations of the illustrated straight line plating machine include a loading station 26, a pretreatment station 27, a transfer and drain station 28, a plating station 29, a rinse transfer station 31, a rinse station 32 and an unloading station 33. The workpieces on their carriers move in succession from station 26 to station 33, and as the workpieces reach tanks 21, 22 and 23 they are lowered into these tanks for appropriate treatment. For this purpose, the sections of the transfer track above each tank are movable in a vertical direction so that the carriers disposed on such vertical movable sections can be lowered. As will be seen later, the portion of the transfer track above plating tank 22 includes means for selectively removing and replacing one or more workpieces from a group which are being plated. It may be stated here briefly, for purposes of describing the general operation of the machine, that the transfer track in section 29 is made up of a plurality of relatively movable track sections 34*a*, 34*b*, 34*c* and 34*d*, and that means are provided for causing these track sections to selectively engage one or more carriers 25 when the track of station 29 is in its lower position, so that those carriers 25 not engaged by their respective track sections remain in the plating tank when the entire track of station 29 is raised.

In describing the sequence of operations of the straight line plating machine embodying this invention, we start with an initial condition in which track 35 of station 27 and track 36 of station 32 are in their lower positions, whereas track sections 34 of station 29 is in its upper position. At this time the workpieces held by carriers 25*b*, *c*, *d* are being pretreated and the workpiece held by carrier 25*j* is being rinsed. Track section 34*a* of station 29 has just lifted carrier 25*f* during its upward movement, but carriers 25*g*, *h*, *i* have remained in their lower positions within plating tank 22. Carrier 25*e* is on track 37 of plating transfer station 28, ready to be transferred to track section 34*a* to replace carrier 25*f*. Carrier 25*a* on track 38 of loading station 26 has just received a workpiece, whereas carrier 25*k* on track 39 of unloading station 33 has just been relieved of its finished workpiece.

Figure 12:
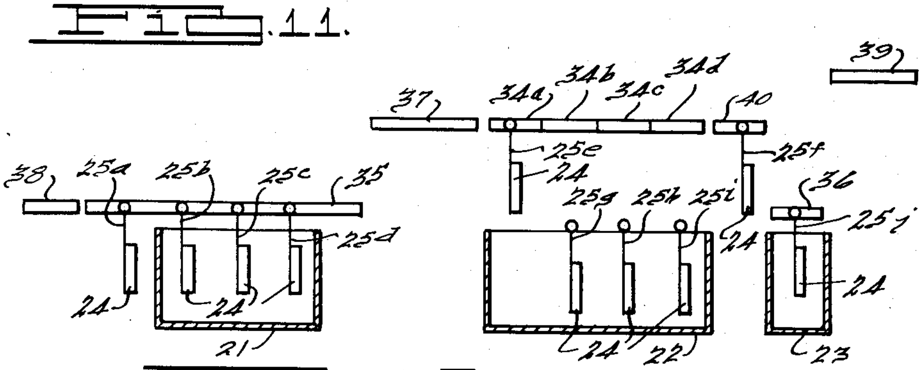
Figure 12 is a schematic view similar to Figure 11 but with a workpiece moved from the plating station to the rinse standby station and a new workpiece replacing the previous one in the plating station.

The carrier transfer mechanism (described in detail below) now operates to shift carrier 25*f* past carriers 25*g*, *h*, *i* to track 40 of rinse transfer station 31 and to shift carrier 25*e* into place on track section 34*a*, as shown in Figure 12. This means of course that the workpiece held by carrier 25*e* may now take the position in plating tank 22 which was vacated by carrier 25*f*, the latter being held in readiness for rinsing in tank 23. Meanwhile, carrier 25*a* has been transferred to the first portion of track 35 in station 27 which extends rearwardly from tank 21. Track 39 of unloading station 33 has been elevated to permit its carrier 25*k* to be returned by a pair of overhead return tracks (not shown in the schematic drawings).

Figure 13:
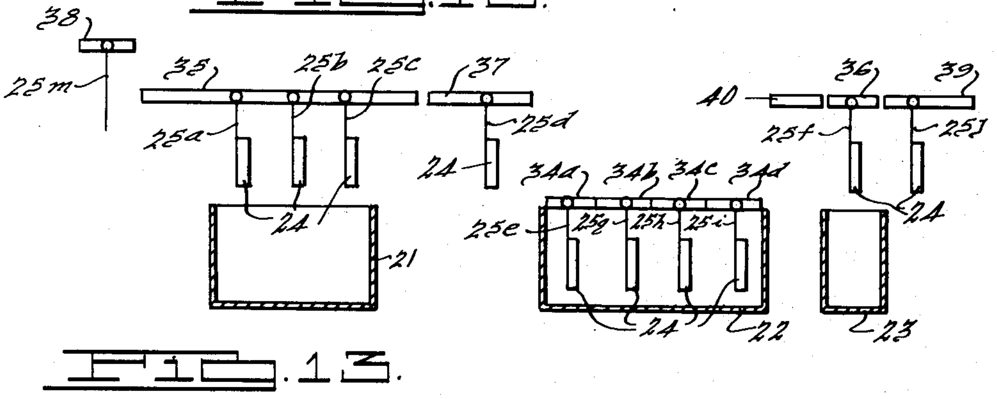
Figure 13 is a schematic view similar to Figures 11 and 12 but with the pretreating and rinse stations in their raised position and the plating station in its lowered position.

Track sections 34 of plating station 29 are then lowered, placing carrier 25*e* into the plating tank as shown in Figure 13. At the same time, tracks 35 and 36 of stations 27 and 32 respectively are raised. The transfer mechanism now operates to shift carrier 25*d* from track 35 onto track 37 of plating transfer station 28, and to move carriers 25*a*, *b*, *c* forwardly on track 35, carrier 25*a* moving into position above pretreatment tank 21. Track 38 is simultaneously elevated into alignment with the overhead return track (not shown) to receive a new carrier 25*m*. At the same time, carrier 25*f* is moved from rinse transfer station 31 onto track 36 of rinse station 32, carrier 25*j* which had been in the rinse tank being shifted onto descended track 39 of unloading station 33.

Figure 14:
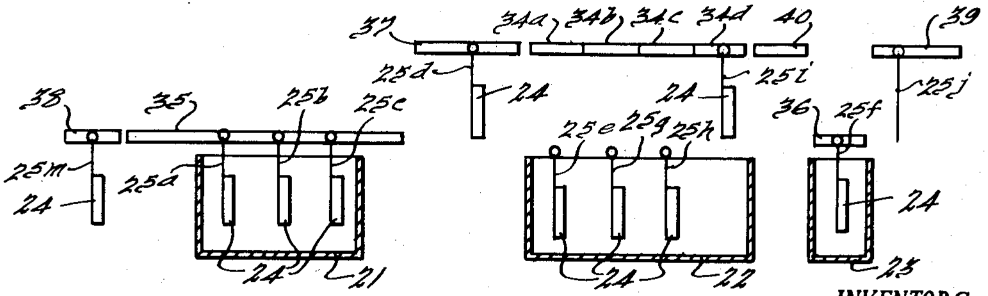
Figure 14 is a schematic view similar to Figures 11 to 13 but with the plating station again raised with another finished workpiece.

When another workpiece has been completely plated, for example the workpiece held by carrier 25*i*, this workpiece is removed from plating tank 22 by its appropriate track section 34*d*. This is shown in Figure 14, wherein it will be noted that tracks 35 and 36 are again lowered and track sections 34 raised, as in Figure 11. It is thus seen that due to the novel arrangement of the movable track sections in plating station 29, the workpieces in plating tank 22 are selectively removed, the sections of the transfer track serving as the selecting means. Carrier 25*i* will now be shifted to track 40 of rinse transfer station 31 and carrier 25*d* will be shifted from plating transfer station 28 into position on track section 34*d*. Meanwhile, track 38 of loading station 26 has been lowered to receive a new workpiece on carrier 25*m* and the workpiece on carrier 25*j* has been removed at unloading station 33. The cycle will continue as before, with the workpieces in plating tank 22 being removed in any desired sequence.

Referring now more particularly to the construction of Figures 1–10, Figure 1 shows the general arrangement of the machine, and includes loading station 26, pretreating station 27, plating transfer station 28, plating station 29, rinse transfer station 31, rinse station 32, and unloading station 33. The construction of portions of the machine is generally similar to that shown in patent to Davis No. 2,484,079 for Hydraulically Operated Plating Machine, and certain parts of the present machine not relating to the present invention therefore need not be described in detail. Loading station 26 includes an elevator frame 41 which can be lifted by actuating chains 42 so that tracks 38 of the loading station may be aligned with overhead carrier return tracks 43. When in its lowered position tracks 38 of the elevator frame are aligned with tracks 35 of pretreatment frame 44 at pretreatment station 27. The latter frame is also vertically movable by means of a plurality of chains as 45, and when in their upper position tracks 35 of pretreatment frame 44 are aligned with tracks 37 of plating transfer station 28. Pusher means, preferably in the form of reciprocating pusher slides, described later, are provided for transferring carriers 25 from elevator frame 41 to pretreatment frame 44 and from the pretreatment frame to station 28. The means for vertically moving the loading and unloading elevators, and pretreatment frame, as well as the actuators for the carrier pusher means, forming in themselves no part of the present invention, need not be described in detail, but reference is here made to the above mentioned Patent No. 2,484,079 wherein such means are described. It may be here stated, however, that reference is hereinafter made to the pusher mechanism as it affects the transfer of carriers from plating transfer station 28 to plating section 29 and from the plating section to rinse transfer station 32.

Figure 2:
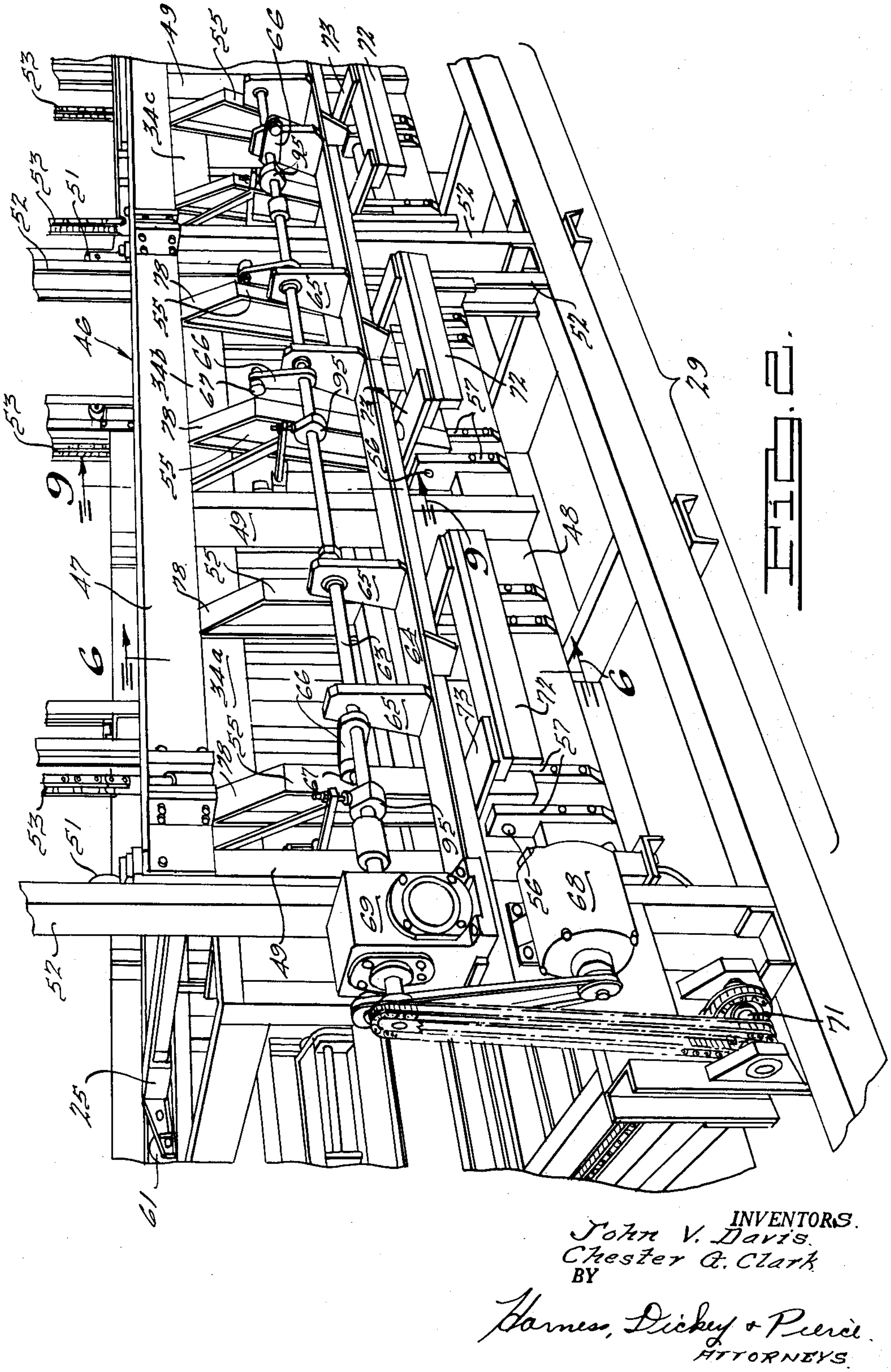
Figure 2 is a perspective view of the plating station with the frame down and showing the cam shaft and cam drive mechanism for the movable track sections.
Figure 2:
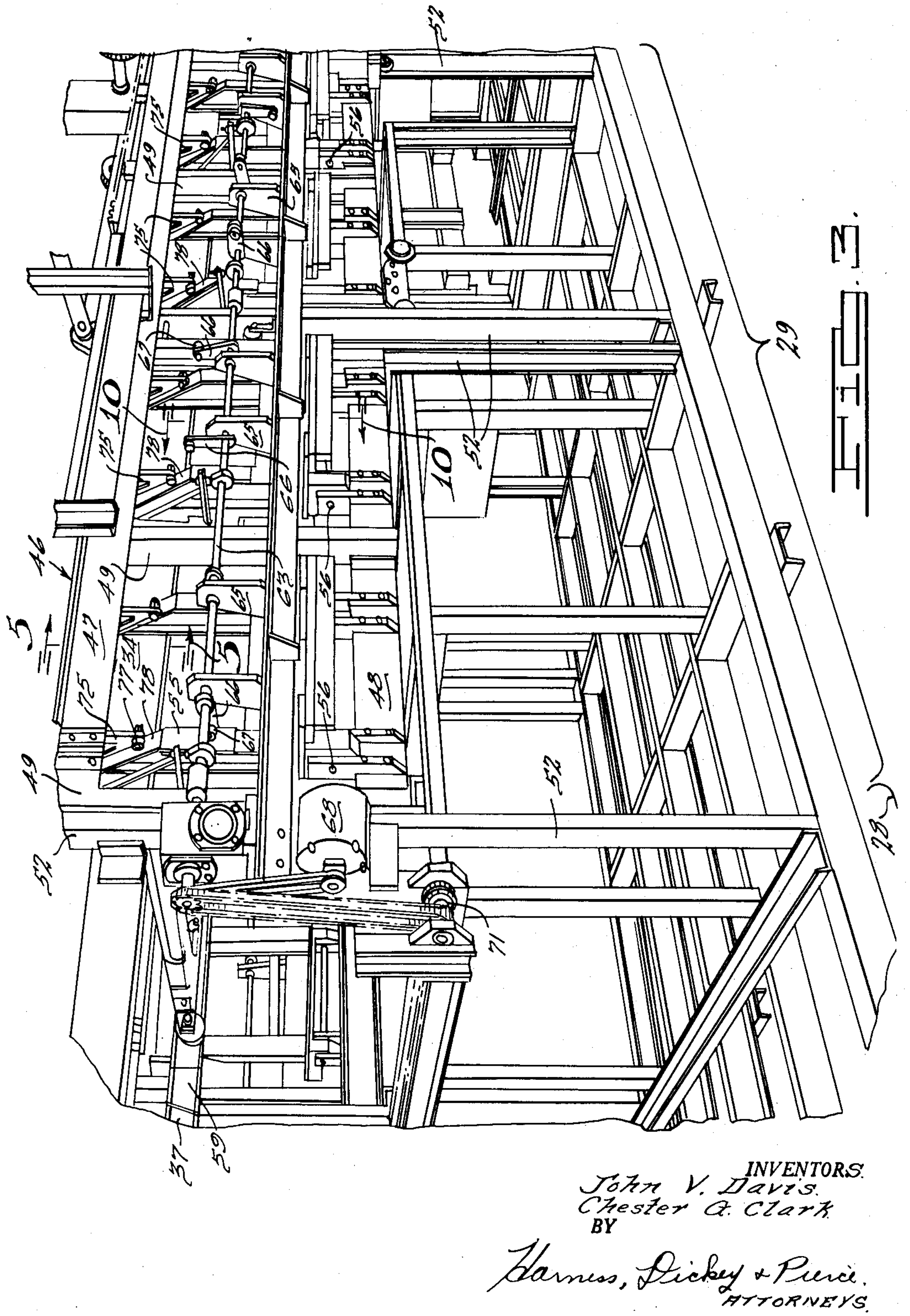

The general construction of plating station 29 is best seen in Figures 2 and 3. The station includes a vertically movable frame generally indicated at 46 which has a pair of upper longitudinal members 47, a pair of lower longitudinal members 48, and vertical members 49. The frame carries a plurality of rollers 51 by means of which the entire frame is vertically movable, rollers 51 being guided by a plurality of vertical stationary rails 52. The means for lifting and lowering the frame preferably comprises a plurality of chains 53 on both sides of the machine, these chains being operable by a hydraulic cylinder 54 visible in Figure 1, together with linkage similar to that for elevating pretreatment frame 44.

Figure 4:
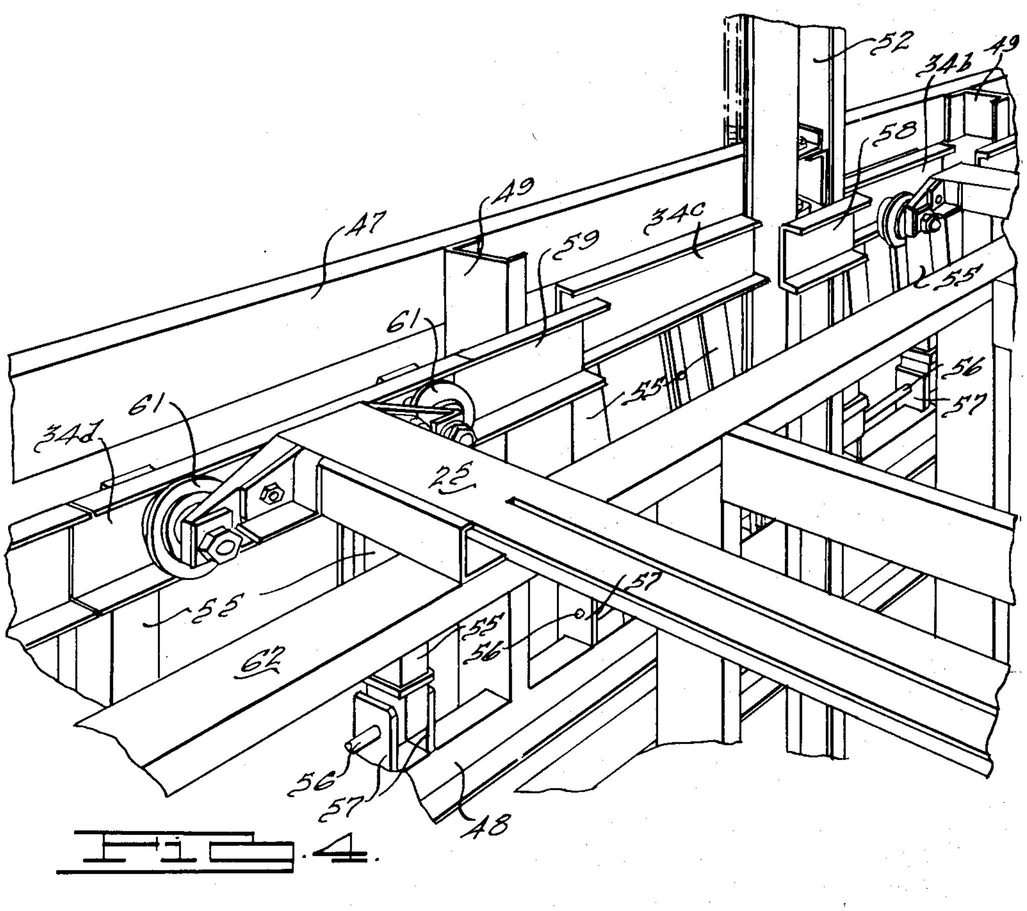
Figure 4 is a perspective view of the interior of the transfer track showing the stationary and movable sections thereof with the selecting station in contact with a carrier in its lowered position.
Figure 5:
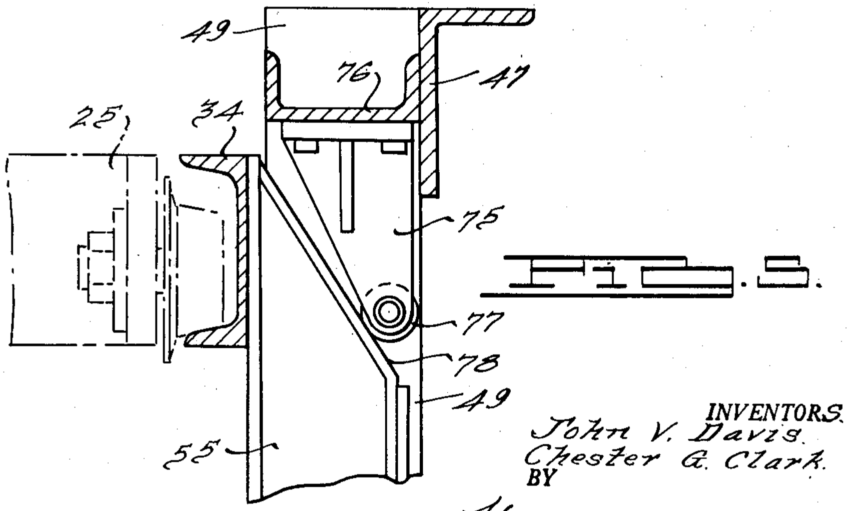
Figure 5 is a fragmentary cross-sectional view taken along the line 5—5 of Figure 3 and showing one of the upper aligning cams for the movable track sections.

As indicated previously, plating frame 46 includes means for selectively lifting one or more of a plurality of carriers resting on the plating tank, and this means includes a plurality of pairs of movable track sections 34. As is best seen in Figure 4, track sections 34 are disposed inwardly of upper longitudinal frame members 47, and are each pivotally supported by a pair of pivoted arms 55. Each of these arms is pivoted by a pin 56 to a pair of lugs 57 secured to lower longitudinal members 48, so that arms 55 are movable between an outer position as shown by the central and right hand pairs of arms in Figure 2 and an inner position as shown by the left hand pair of arms in Figure 2. Sufficient lateral space is of course allowed between track sections 34 and longitudinal frame members 47 to permit this swinging movement.

When arms 55 are swung to their inner positions with frame 46 in its upper position, track sections 34 are in alignment with tracks 37 of station 28 and with tracks 40 of station 31. Due to the interposition of vertical rails 52 and of vertical members 49 of frame 46 it is necessary to provide a plurality of stationary interconnecting track sections 58 and 59 secured to rails 52 and vertical members 49 respectively. These stationary interconnecting tracks, which are relatively short, serve to interconnect adjacent movable track sections 34. When frame 46 is in its lowered position, as seen in Figures 2 and 4, track sections 34 are aligned with rollers 61 at the outer ends of carriers 25, so that inward movement of a particular pair of track sections will engage the flanged rollers of their adjacent carrier. It may be here stated that in Figure 4 the carriers 25 are shown as resting on a rail 62, this rail representing the edge of the plating tank which is not shown in the figure.

Means are provided for moving each of the movable pairs of track sections 34 into carrier-engaging position in timed sequence, and this means includes a cam shaft 63 rotatably supported on a longitudinal member 64 secured to frame 46. Member 64 carries a plurality of bearing members 65 through which shaft 63 extends, and the shaft carries a plurality of cams 66 which are adapted to engage supporting arms 55 of the movable track sections. As is seen in Figures 2 and 3, cams 66 comprise arms carrying rollers 67 at their outer ends, and a pair of cams is provided for each pair of arms 55 which support a movable track section 34. In the illustrated embodiment, succeeding pairs of cams are angularly displaced 90°, although it will be understood that other arrangements could be used if desired. Cam shaft 63 is driven by a motor 68 through a gear reduction drive 69, and a chain coupling 71 is provided from gear reduction drive 69 to a symmetrically operating cam shaft (not shown) on the opposite side of frame 46.

Figure 6:
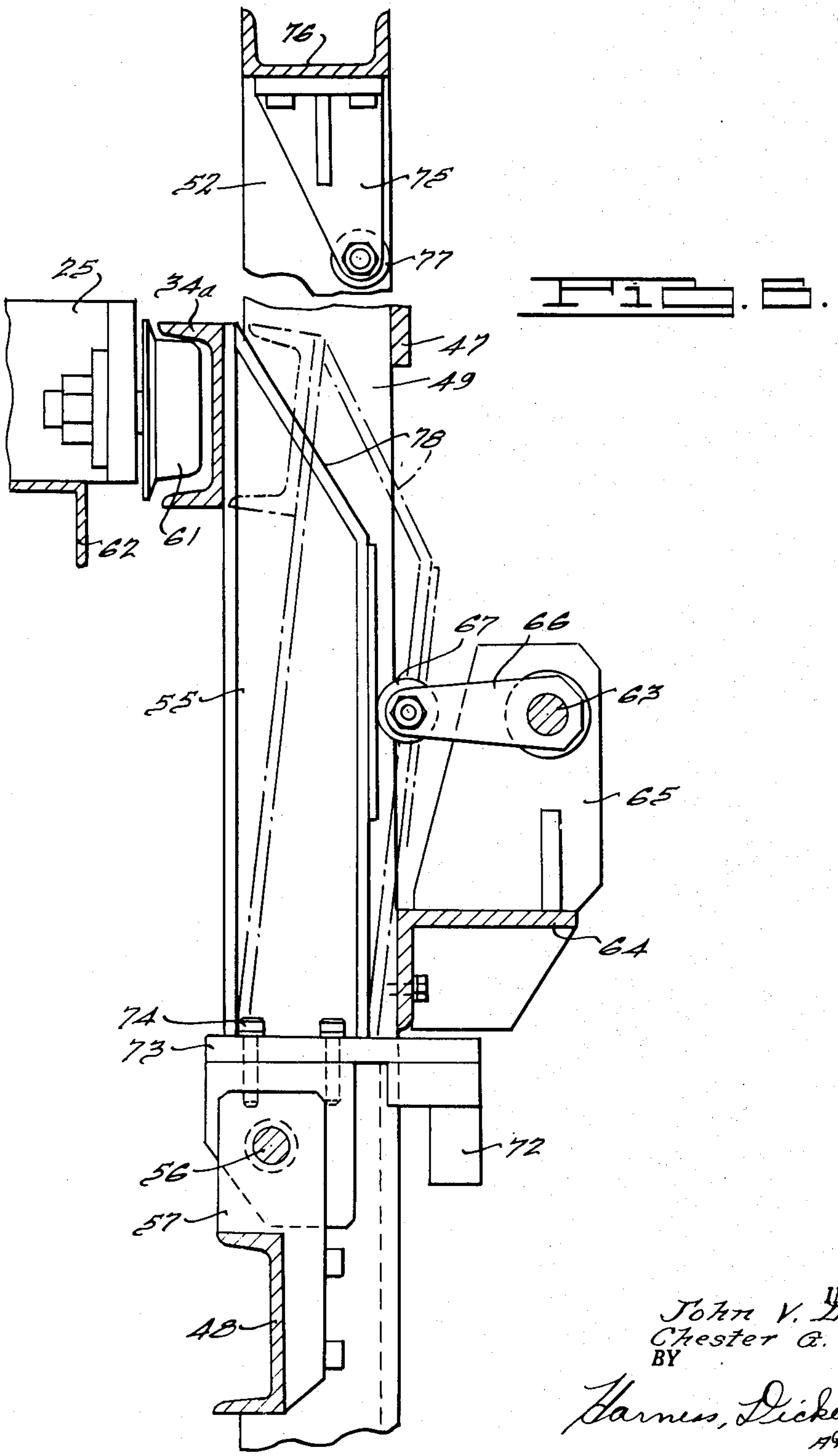
Figure 6 is a fragmentary cross-sectional view taken along the line 6—6 of Figure 2 and showing the cooperation of a track selector cam and a movable track support as well as the manner in which the movable track section engages a carrier.

As is seen best in Figure 6, each cam 66 is adapted to swing its corresponding arm 55 inwardly when the cam is in a position extending toward the center of the machine. When in this position movable track section 34 is disposed over a pair of rollers 61 attached to carrier 25, the carrier thus being liftable when frame 46 is raised. A counterweight 72 is secured to the lower ends of each pair of arms 55 by means of outwardly extending members 73 and bolts 74. As frame 46 descends the downward travel continues until carrier 25 rests on rail 62 and arms 55 are free of rollers 61, and it will thus be seen that when cams 66 are rotated away from their position shown in Figure 6, counterweight 72 will cause arms 55 to swing clockwise about their pivoted ends 56 into the dot-dash position shown in Figure 6. When in this position movable track section 34 is clear of rollers 61, so that frame 46 may be lifted without disturbing the corresponding carrier 25. It should be noted that the position of any pair of movable track sections 34 as determined by the position of their corresponding cams 66 will not affect the position of any other pair of movable track sections, since the track sections are independently movable as determined by cams 66 and counterweights 72.

As indicated above, all the movable track sections 34 combine to form a continuous track when frame 46 is in its upper position, so that the carrier or carriers which have been selectively lifted from the plating tank may be transferred to rinse standby station 31. Means are provided which are operative when frame 46 reaches its upper position to swing inwardly those track sections 34 which are not being held inwardly by cams 66. In the illustrated embodiment this means includes a plurality of upper alignment cams 75 secured to longitudinal members 76 of the machine frame and extending downwardly therefrom. These cams carry rollers 77 at their lower ends, which rollers are adapted to engage inclined surfaces 78 at the upper portions of track supporting arms 55. As is seen best in Figures 5 and 6, the relative positions of rollers 77 and surfaces 78 are such that when arms 55 are raised with frame 46, those arms which are in the dot-dash position of Figure 6 will be swung inwardly by the engagement of surfaces 78 with rollers 77. In their upper positions therefore, all track sections 34 will be in alignment so that carriers 25 may be transferred as described above.

Figure 8:
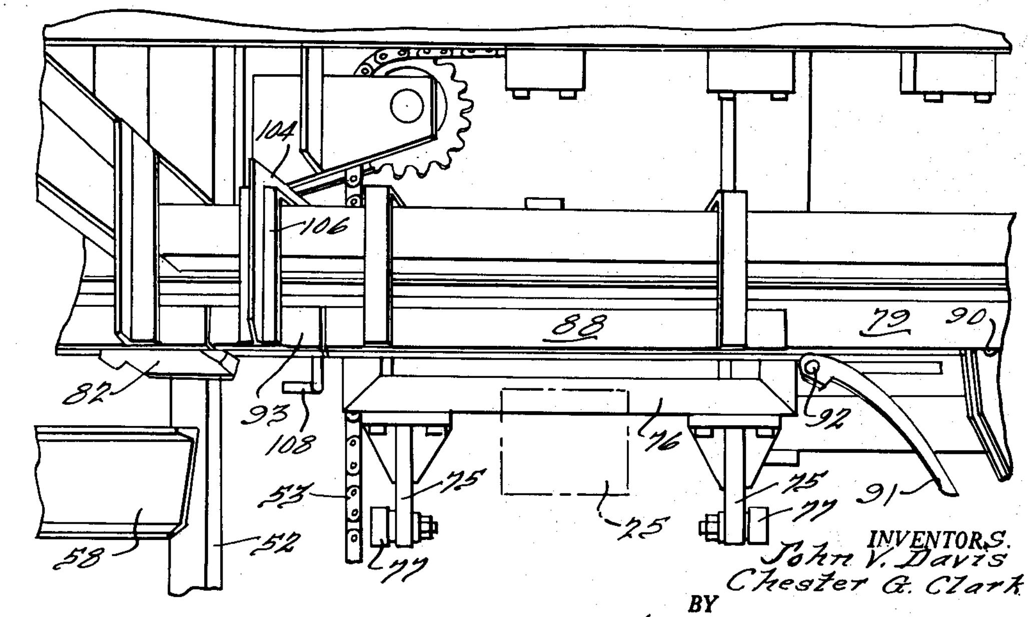
Figure 8 is a perspective view similar to Figure 7 but with the gate in its closed position to maintain the retracted position of the pusher.
Figures 9, 10:
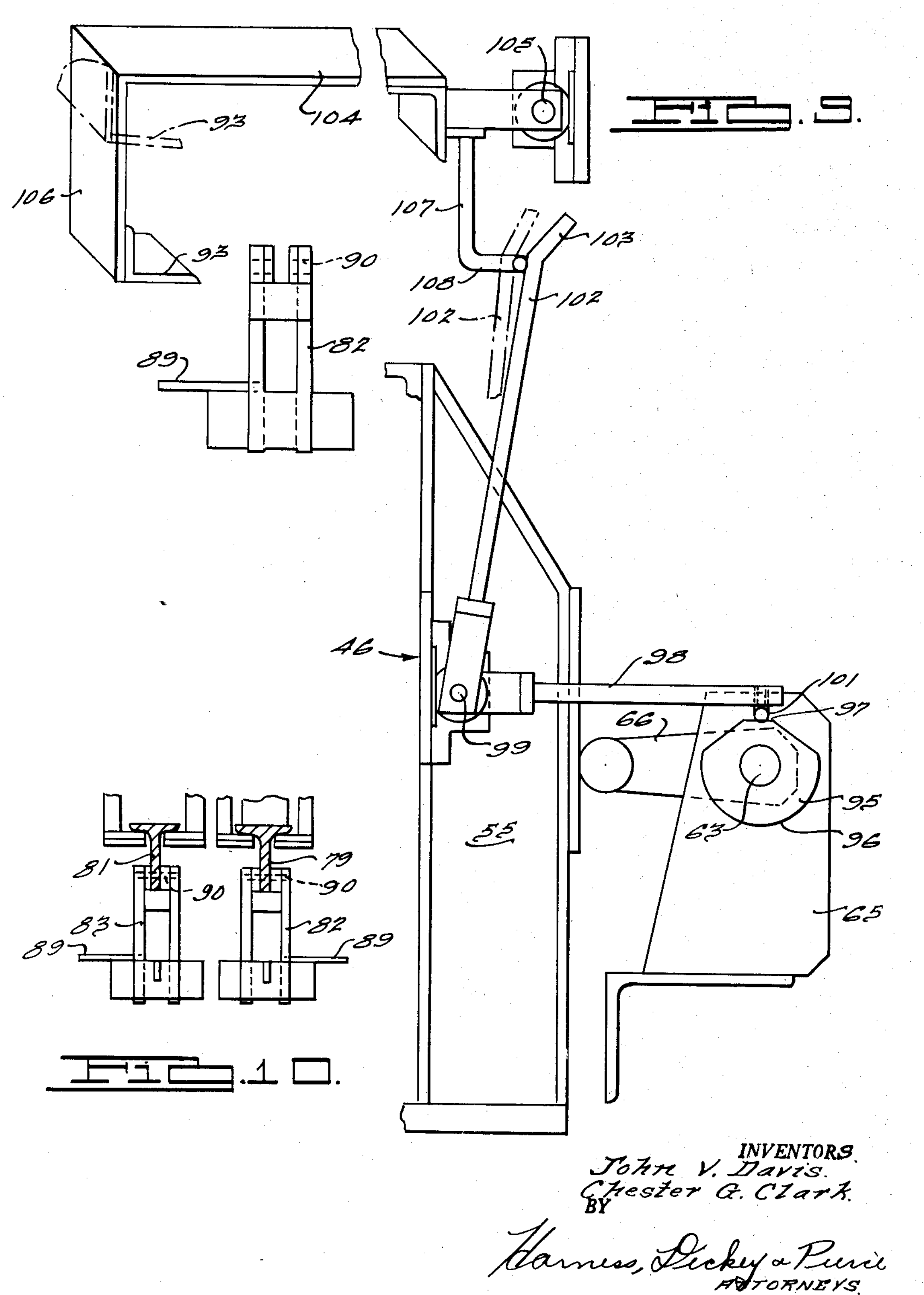
Figure 9 is a fragmentary elevational view taken along the line 9—9 of Figure 2 and showing the operating means for the pusher retractor gate.
Figure 10 is a fragmentary cross-sectional view taken along the line 10—10 of Figure 3 showing the pusher slides and their attendant mechanism.
Figure 11:
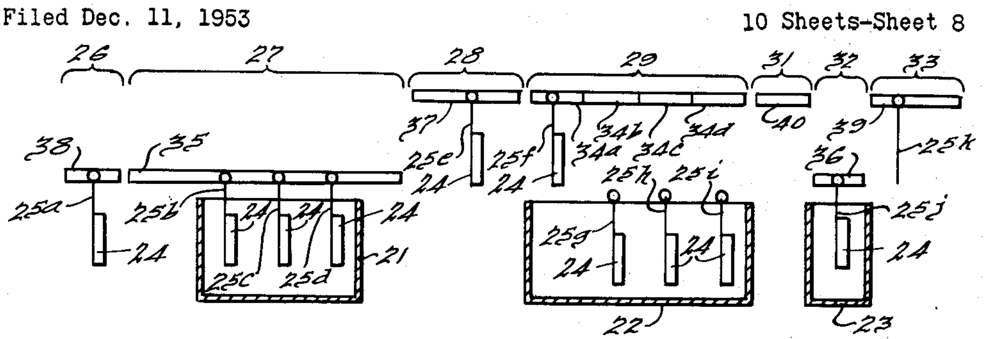
Figure 11 is a schematic view showing the relation between the various stations and tanks, the pretreating and rinsing stations being shown in their lowered positions and the plating station in its upper position.

The means for moving carriers 25 along the transfer tracks is generally similar in construction to the moving means described in aforementioned Patent No. 2,484,079, and comprises a pair of inner pusher slides or carriers 79 and a pair of outer pusher slides or carriers 81, one of each pair of slides being shown in Figure 10. Each inner slide 79 has a plurality of pushers 82 pivotally suspended therefrom, and each outer slide 81 carries a plurality of pushers 83. Each pusher 82 and 83 is so constructed as to swing freely about its pivot axis when engaged on its rearward side, but is prevented from free swinging movement when engaging a carrier on its forward side. As seen in Figures 8 and 10, slides 79 and 81 are slidably supported by the frame of the machine and are actuatable by hydraulic cylinders as 84 and 85 (Fig. 1) on each side of the machine, these cylinders acting through links 86 and 87 respectively, as described more particularly in the aforesaid patent. When either pair of slides therefore is actuated in a forward direction, that is toward the right in Figure 1, appropriate pushers 82 or 83 carried by the moving slides will engage adjacent carriers 25 and will move these carriers in a forward direction. Engagement of the carriers during rearward movement of slides 79 and 81 will merely result in pivoted retracting movement of the pushers, with no effect on the carriers.

Two pairs of pusher slides, 79 and 81, are shown in the illustrated embodiment for plating station 29 and its related stations, but it will be understood that a different number of slides could be used in appropriate circumstances. In the present example, it is apparent that by reciprocating slides 79 and 81 alternately and properly spacing pushers 82 and 83 one may transfer a carrier from a given position in plating station 29 to rinse standby station 31, the carrier passing over or skipping the carriers still in the plating tank. It is thus possible in a single operation to move a carrier 25 from a plating station position furthest from station 31 to station 31, slides 79 and 81 operating alternately to effect this transfer in a rapid manner. At the same time, a new carrier 25 may replace that removed from the plating tank in the same relative position. In actual practice of course, one or the other of pusher slides 79, 81 could also be utilized for transferring carriers from pretreatment station 27, plating standby station 28 and from rinse standby station 31 to rinse station 32.

It will be seen from an examination of Figures 11 to 14 that in the case of a carrier such as carrier **25*f* which must be transferred from the rearward end of plating station 29 to station 31, several alternate strokes of inner and outer pusher slides 79 and 81 will be required, since each stroke will only move the carrier a fraction of the total distance, and in the embodiment shown, this distance is one station width. When new carrier 25*e* arrives into the position vacated by carrier 25*f*, it is necessary to prevent carrier 25*e* from being moved out of its newly acquired position by the continued reciprocations of slides 79 and 81 which are necessary to complete the transfer of carrier 25*f* into station 31. The means for insuring that each carrier newly arriving in plating station 29 will be transferred to and halted in its proper position includes a plurality of pusher retractor guides 88, shown best in Figures 7 and 8. These guides each comprise stationary angle members supported adjacent pusher slides 79 and 81 at points longitudinally spaced along the slides, each guide controlling a corresponding pusher 82 or 83. Each pusher 82 or 83 carries a pin 89, and means are provided for causing pin 89 to ride up onto its corresponding guide 88 when the slide is moving rearwardly, or to the left in Figures 7 and 8, thus causing retracting movement of the pusher about its pivot 90. This means includes a curved member 91 pivoted at 92 to the forward end of each guide 88 and extending forwardly and downwardly therefrom. Member 91 is adapted to swing freely in a forward direction when engaged by pin 89 from the rear with pusher 82 or 83 moving forwardly. However, after pin 89 passes under member 91 and the slide is moved rearwardly, pin 89 will ride up on member 91, which is prevented from swinging in a clockwise direction, by a stop (not shown), as seen in Figuers 7 and 8. This action will cause counterclockwise or retracting movement of pusher 82 about its pivot 90, lifting the pusher above a level at which it can engage a carrier 25**, such carrier being shown schematically in dot-dash lines in Figures 7 and 8. Therefore, unless the pusher is allowed to drop into its engaging position before it is again moved forwardly, it will clear any carrier which would normally be in its path and thus be prevented from moving such carrier.

Figure 7:
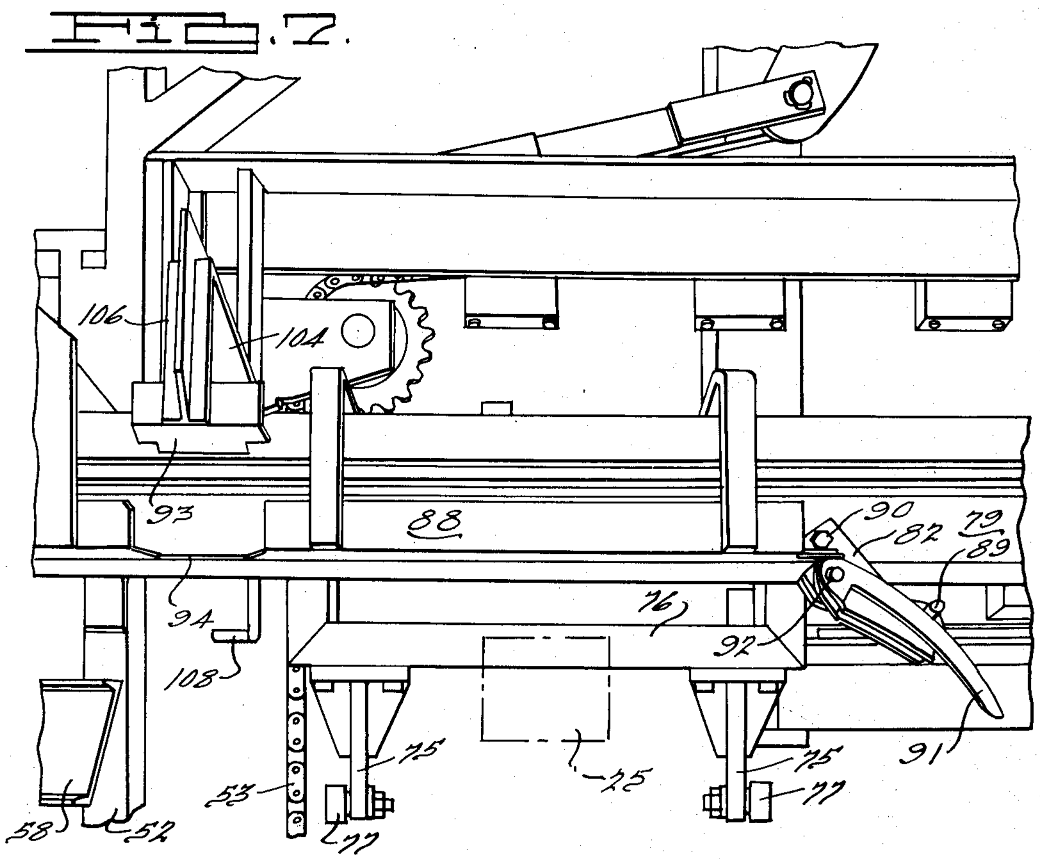
Figure 7 is a perspective view of a pusher retractor guide with its gate in open position to allow a pusher to fall behind a carrier.

Means are provided for selectively permitting each pusher 82 or 83 to again drop into its engaging position before its forward stroke, the purpose of such mechanism being, as stated previously, to continue transfer of a carrier not yet in its proper position in the plating station but to halt a carrier which has reached its proper position. This means includes a movable gate 93 which is part of each pusher retracting guide 88 and is controlled, in a manner described below, by cam shaft 63. When in its raised position, as seen in Figure 7, gate 93 uncovers an opening 94 in the bottom of guide 88. The relative positions of the parts are such that when pusher slides 79 and 81 are in their extreme rearward positions, pushers 82 and 83 are disposed rearwardly of gate openings 94 as seen in Figure 8. Thus, if gate 93 is lifted into its open position, upon the next rearward stroke of the pusher its pin 89 will drop through opening 94, and the pusher will then be in its operative or engaging position, ready to transfer any carrier 25 which it may be engage. However, when gate 93 is in its lowered or closed position as seen in Figure 8, it closes opening 94 forming a continuous guide 88 so that pusher 82 or 83 cannot drop out of its retracted position on guide 88 and will thus be prevented from engaging a carrier 25. The pusher will merely ride along guide 88 in its retracted position, descending along member 91 and being again retracted upon its next rearward movement. Thus, with a particular gate 93 in its closed position a slide 79 or 81 may make any number of strokes without disturbing a carrier 25 adjacent the closed gate.

As stated previously, the position of each pair of gates 93 is controlled by cam shaft 63, and in particular those gates 93 are closed which are adjacent a pair of movable track sections 34 held in carrier-lifting position by cams 66. The purpose of this arrangement is so that a carrier 25 newly arriving in plating station 29 will continue to advance until it reaches that position which has just been vacated by a carrier 25 lifted from tank 22 by a pair of movable track sections 34. The gate-controlling means is best seen in Figure 9 wherein cam shaft 63 is shown as having a plurality of gate cams 95 fixed thereto, one such cam being provided for each pair of track actuating cams 66. Each cam 95 has a high dwell portion 96 and a low dwell portion 97, and a bell crank 98 is pivoted at 99 to frame 46 adjacent each cam 95. Bell crank 98 has a cam follower 101 riding on cam 95 and an upwardly extending arm 102 with an outwardly sloping upper end 103. Each gate 93 is carried by an arm 104 pivoted at 105 to the machine frame and extending inwardly therefrom, this arm having a downwardly extending portion 106 to which gate 93 is secured. A downwardly extending member 107 is secured to arm 104 adjacent pivot 105 and has an outward extension 108 engageable by arm 102 of bell crank 98 when frame 46 is lifted.

Bell crank 98 is movable between an inactive position shown in solid lines in Figure 9 and a gate lifting position shown in dot-dash lines. The inactive position is caused by engagement of cam follower 101 on lower dwell portion 97 of cam 95, and the gate lifting position is caused by upper dwell portion 96. When arm 102 is in its gate-lifting position as shown in dot-dash lines, its engagement with extension 108 of arm 107 when frame 46 is lifted will cause arm 104 to swing clockwise about pivot 105, thus causing gate 93 to be lifted as shown in dot-dash lines. With arm 102 in its inactive position however, it will clear extension 108 when frame 46 is lifted and will therefore not affect the position of gate 93 which, as is evident from Figure 9, will normally be held by gravity in its closed position as shown in solid lines. When in this latter position, as indicated previously, gate 93 will prevent pin 89 of pusher 82 or 83 from dropping through opening 94 in guide 88. The relative lateral positions of gate 93 and pin 89 are illustrated in Figure 9 which shows a typical pusher 82, the pusher being shown below its actual height for purposes of clarity.

It is evident from viewing Figure 9 that lower dwell portion 97 of each cam 95 will be effective when its corresponding track actuating cams 66 have moved their respective tracks inwardly to their carrier-engaging positions. Thus, gates 93 of those guides 88 which are adjacent the carrier being lifted will be in closed position, permitting the newly arriving carrier to be properly positioned. Preferably, the extent of upper dwell portion 96 is such that each pair of gates 93 will be lifted whenever their corresponding pair of track sections 34 are not activated to remove a carrier from plating tank 22. In the present embodiment, since four pairs of movable track sections 34 are shown, this is accomplished by having upper dwell portion 96 effective in the three 90°-spaced positions other than that in which track sections 34 are held inwardly. This may perhaps be best understood by referring to Figures 2 and 3 wherein it will be seen that succeeding sets of cams 66 are angularly spaced 90° apart, so that track sections 34 may be operated in sequence by rotating cam shaft 63 90° during each cycle. For each cam 95 therefore, its lower dwell portion 97 will be effective when its corresponding cams 66 are effective, and upper dwell portion 96 will be operative in the other three positions.

Figure 15:
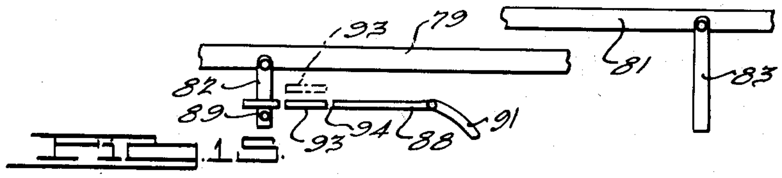
Figure 15 is a schematic view showing the pusher slides and their cooperation with a pusher retracting guide, a first pusher being shown in its engaging position.
Figure 16:
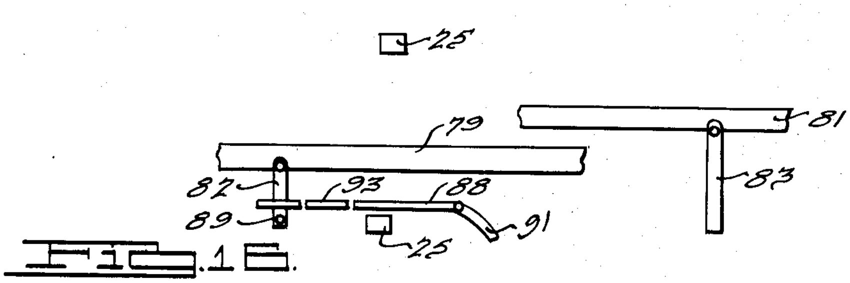
Figure 16 is a schematic view similar to Figure 15 but with carrier raised to the upper position.
Figure 17:
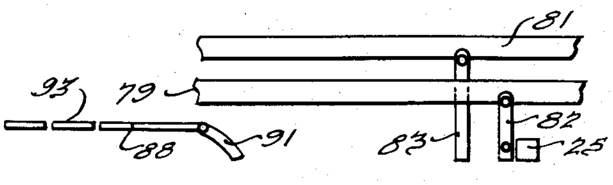
Figure 17 is a schematic view similar to Figure 15 but with the carrier advanced by the first pusher.
Figure 18:
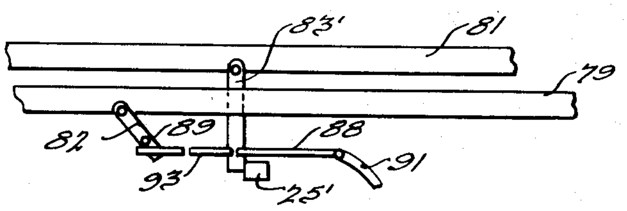
Figure 18 is a schematic view similar to Figures 15 and 16 but with a new carrier in plating position.
Figure 13:
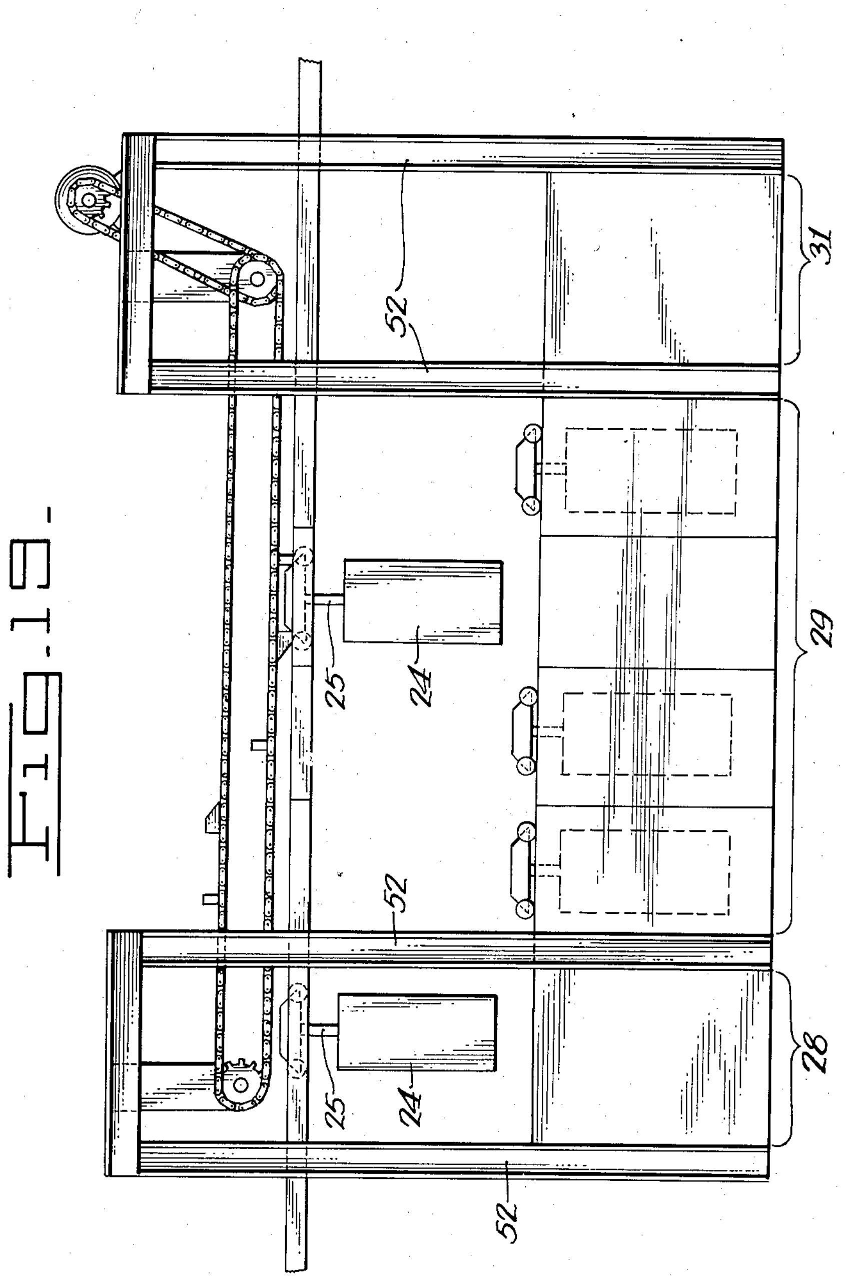

The manner in which gates 93 are effective in permitting the skip transfer and sequential plating operations to take place is illustrated schematically in Figures 15–18. In these figures a single pusher retracting guide 88 is shown, together with portions of pusher slides 79 and 81 carrying pushers 82 and 83 respectively. The pusher slides are shown at different levels and the pushers of different sizes for purposes of clarity, although it will be understood that in the illustrated embodiment the slides are at the same level and the pushers of the same size as shown in Figure 10. Figure 15 shows gate 93 in its closed position, in which it is held by gravity when frame 46 is lowered. Pusher 82 is however in its extended or engaging position since during the previous rearward movement of slide 79 gate 93 had been in dot-dash lines in Figure 15, allowing pin 89 to drop through opening 94. When frame 46 is raised with the pair of track sections 34 adjacent the illustrated guide 88 in their carrier-engaging position, carrier 25 will be raised as shown in Figure 16 until it is aligned with pusher 82. Gate 93, which would ordinarily be opened by the mechanism shown in Figure 9 when frame 46 is lifted, will remain closed since arm 102 is in its solid line position as shown in Figure 9. Pusher slide 79 is then actuated in a forward direction, and pusher 82 will engage carrier 25 and push it forwardly as seen in Figure 17. During this movement pin 89 of pusher 82 will pass under the swingable curved member 91. At the end of its stroke, pusher 82 will have transferred carrier 25 slightly past that pusher 83 which is immediately forward of the original position of pusher 82.

In the next phase of the operation, slide 79 will move rearwardly and slide 81 will simultaneously move forwardly. In this manner pusher 83 will pick up carrier 25 and carry it still further forwardly. At the same time, the next rearward pusher 83′ on slide 81 will transfer a new carrier 25′ to the position previously occupied by carrier 25. It will also be seen that pusher 82 will be moved rearwardly and that pin 89 thereof will ride up on curved member 91 and will stay on pusher retracting guide 88, since the closed position of gate 93 will not permit pin 89 to fall therethrough. It is at this point that the benefit of the closed position of gate 93 will be realized. On the next forward movement of slide 79 (necessary to continue the transfer of carrier 25 to station 31) pusher 82 will clear carrier 25′, permitting this carrier to remain in position to be plated when frame 46 is finally lowered. During the course of the transfer operation, slides 79 and 81 may therefore be retracted and advanced, but this will not affect the position of carrer 25′. It is apparent that any number of strokes of slides 79 and 81 may be had and that therefore the arrangement is applicable to machines having any appropriate number of carrier spaces in plating tank 22. In the next cycle of operation, carrier 25′ will ordinarily remain in the plating tank when frame 46 is raised, and gate 93 will then be opened permitting its adjacent pusher 82 to be effective on each forward stroke of slide 79 to transfer forwardly any carrier which may be delivered to the position occupied by carrier 25′.

The cooperation of the various parts described in the straight line plating machine embodying this invention may perhaps best be understood by an overall description of the operation of the machine, omitting those details which have been previously described for various phases of the operation. Since the invention is more particularly concerned with plating station 29 than with the other treatment stations, the cooperation of the various elements and parts in this area will be reviewed. Starting with a condition in which frame 46 has just been lowered with a carrier 25 to the position shown in Figure 2, cam shafts 63 on either side of the frame will be rotated by motor 68 to cause one set of track actuating cams 66 to engage corresponding track arms 55, swinging these track arms inwardly and causing track sections 34 to engage carrier rollers 61. Those track arms 55 which are not so actuated will be held outwardly by counterweights 72 so that their corresponding carriers are disengaged. The gate controlling cams 95 adjacent the carrier-engaging track sections 34 are rotated by cam shaft 63 to a position in which gate-controlling arm 102 is in its solid line position in Figure 9. All other cams 95 are so rotated that their corresponding arms 102 are in the dot-dash line position of Figure 9. At the same time, a new carrier 25 is moved into position at plating standby station 28, and the carrier which has just been removed from the plating station to rinse standby station 31 is transferred to rinse station 32.

Frame 46 is now raised by chains 53, and when the frame reaches its upper position those track arms 55 which are swung outwardly will engage track aligning cams 75 and be swung inwardly to align all track sections 34. During the upward movement of frame 46 only that carrier 25 which is engaged by track sections 34 will be lifted out of plating tank 22, all other carriers remaining in the tank. As frame 46 approaches its upper position, gates 93 of those pusher retracting slides 88 which are adjacent inactive track sections 34 will be opened. However, gates 93 adjacent those track sections 34 which have lifted a carrier 25 from the plating tank will remain closed. Pusher slides 79 and 81 will now be alternately reciprocated to transfer lifted carrier 25 to rinse standby station 31, this carrier skipping any lowered carriers between it and the rinse standby station. The reciprocating movement of the pusher slides will also transfer a new carrier 25 from station 28 into the position vacated by the carrier 25 transferred to the station 31. The positions of gates 93 as described with respect to Figures 15–18 will automatically result in new carrier 25 being moved forwardly until it reaches its proper position.

After the proper number of reciprocating movements of slides 79 and 81 have taken place, frame 46 will again be lowered. As track arms 55 move away from aligning cams 75 they will be swung outwardly by counterweights 72, except for those arms holding the new carrier 25. As for these latter arms, they will be held inwardly by cams 66, since cam shaft 63 has not rotated during the time in which frame 46 was in its upper position. It will be apparent, therefore, that cam shaft 63 may be supported on a stationary support and that the desired selection will be obtained so long as cams 66 are in position to contact arms 55. When this frame reaches its lower position, cam shaft 63 will again rotate to select another carrier for removal from the plating tank.

The above-described sequence of operations of the various moving parts of the machine of this invention may be obtained and timed by a cascade electrical circuit which actuates the hydraulic pusher and elevating means aforementioned. The sequence is obtained by electrical contacts suitably positioned to actuate the succeeding movement upon the conclusion of the previous movement.

It should be emphasized that the principles of this invention are of wide use and are not confined to the particular arrangement shown in the illustrated embodiment. The system described is of a flexible nature and could be applied to plating machines having widely varying capacities, different numbers of treatment stations, and various plating times. The arrangement affords a continuous and uninterrupted delivery of plated articles even when the articles require a relatively long plating time, and this is done with a minimum of occupied space and using relatively inexpensive parts. As one example of the flexibility of the basic arrangement of parts, it may be mentioned that the advancement of the carriers into and from the sections of plating station 29 to rinse transfer station 31 may be accomplished by the use of a chain instead of employing the reciprocating slides 79, 81 of the hereinabove described type. In machines having a long plating station 29 accommodating a large number of work carriers which must be selected and moved to rinse transfer station 31, it is preferred to employ chain means for advancing the selected carriers because the transfer can be effected in a shorter period of time. A chain arrangement for this purpose which has been successfully employed consists of a pair of chains carried by a suitable frame supported by stationary rails 52 and disposed immediately above the upper transfer track, each chain being disposed adjacent to a side of the machine. The chains are mounted on vertically disposed sprockets positioned at the ends of the supporting frame, which frame has a length corresponding approximately to the length of plating station 29, and carry a pair of pushers rigidly secured thereto and positioned one hundred and eighty degrees apart on the chain. The pushers may be of the type above disclosed or may consist of a forward pivoted portion and a rearward stationary portion which are spaced apart to receive a carrier 25 therebetween as the chain advances toward station 31. Such a two-piece pusher construction assures positive stopping of the carrier when the chain stops and avoids overrunning of the desired position.

The chain may be actuated intermittently by conventional driving means controlled electrically by suitably positioned limit switches. When using a chain, the above described sequence of operations is basically unchanged except that the successive operation of pusher slides 79 and 81 is eliminated and the positioning of a new carrier 25 in the position vacated is accomplished by a limit switch which stops the forward motion of the chain when the vacated position is reached by the new carrier 25. The use of two pushers on the chain instead of one reduces the transfer time as will be apparent from the following description of the transfer operation employing chain means in the plating station 29. With frame 46 in the raised position and a new carrier in transfer station 28 ready to be moved into plating station 29, the chain is forwardly actuated and a pusher, preliminarily positioned slightly rearwardly of the carrier to be moved to rinse standby station 31, contacts the carrier and moves that carrier to station 31. The chain continues its forward motion and the other pusher contacts the new carrier in station 28 and advances it to the vacated position in station 29, at which position the chain is stopped by appropriate limit switch action. As the frame 46 lowers to position the new carrier in the plating tank, the chain advances until a pusher is immediately behind the position which the next carrier to be removed will occupy when the frame 46 is again raised to its upper position. The positioning of the pusher during this portion of the cycle insures immediate contact between the pusher and the carrier to be removed to station 31 when the chain is again forwardly actuated and avoids any possibility of contacting the new carrier 25 in station 28 prior to having transferred the old carrier from plating station 29 to station 31.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. In a machine having means for supporting workpiece carriers in their lowermost position, a liquid treating station including a frame, a plurality of pairs of opposed track sections carried by said frame, the frame being movable between a lower position and an upper position, means for causing said track sections to be aligned with each other in a position to engage and support a carrier when said frame is in its upper position, means for selectively moving each pair of said track sections when said frame is in its lower position between a retracted position and a carrier-engaging position.

2. The combination according to claim 1, further provided with means for transferring a selected carrier which has been lifted by said frame along said track to a position beyond said liquid treating station while said frame is in its upper position, and means for transferring another carrier to the position vacated by said first carrier.

3. In a machine, a pair of opposed tracks for guiding workpiece carriers, a liquid-treating station having a tank, a frame adjacent said tank, means for vertically moving said frame between upper and lower positions, a plurality of pairs of opposed sections of said track carried by said frame, means for selectively moving each pair of said sections when said frame is in its lower position between a position engaging one of said carriers and a position disengaged from said carriers, means for holding only a selected pair of track sections in carrier-engaging position as said frame is raised, and means for aligning those track sections which are in their disengaged position with the pair of track sections in its engaged position when said frame reaches upper position.

4. The combination according to claim 3, those track sections which are selectively held in their engaged position being aligned with the remaining portions of track in said machine when said frame is in its upper position.

5. The combination according to claim 3, further provided with track sections pivotally supported by said frame, a cam shaft, and cams on said cam shaft engageable with said sections to swing said sections between said disengaged to said engaged position.

6. The combination according to claim 5, said sections being further provided with means constantly urging the sections into their disengaged positions, said cams acting in opposition to said last-mentioned means.

7. The combination according to claim 3, further provided with track aligning means including cams engageable by said sections when said frame is moved to its upper position, said cams urging said sections in a direction aligning said sections with the track section in carrier-engaging position.

8. The combination according to claim 3, further provided with pusher means adapted to engage a carrier held by said track when said frame is in its upper position, and means for actuating said pusher means to transfer a carrier lifted by said pair of movable track sections along said track to remove such carrier from the tracks supported on said frame.

9. The combination according to claim 8, said pusher means further including means for transferring a carrier along said track to a selected position on one of the pair of track sections carried by said frame, and means for disenabling a portion of said pusher means when said carrier arrives at such position, whereby said carrier is retained in such position.

10. In a plating machine, a first station, a second station, a plating station between said first and second stations and having a plating tank, a pair of opposed tracks at said first and second stations, a frame at said plating station, means for vertically moving said frame between an upper and a lower position, a plurality of pairs of opposed track sections carried by said frame, means for moving said track sections into alignment with the tracks at said first and second stations when said frame is in its upper position, means for selectively moving a pair of track sections inwardly when said frame is in its lower position, said track sections when moved inwardly being adapted to engage opposite ends of a workpiece carrier, transfer means extending along said first and second stations and said plating station adjacent said tracks and track sections, pusher means carried by said transfer means and adapted to engage a carrier held by said inwardly moved track sections when said frame is in its upper position, additional pusher means carried by said transfer means and adapted to engage a carrier held by the tracks of said first station, and means for actuating said transfer means to transfer the carrier held by said inwardly moved track sections to said second station, and to transfer the carrier at said first station to one of said pairs of movable track sections.

11. The combination according to claim 8 wherein said pusher means is a chain.

12. The combination according to claim 11 wherein said chain is continuous and carries a pair of pushers, said pushers being positioned 180° apart on said chain.

13. The combination according to claim 12 wherein said pushers consist of a forward pivotally mounted portion and a rearward stationary portion spaced from said forward portion.

References Cited in the file of this patent

UNITED STATES PATENTS

| | | |
|---|---|---|
| 2,048,938 | Larson et al. | July 28, 1936 |
| 2,075,209 | Kuebler | Mar. 30, 1937 |
| 2,591,681 | Davis | Apr. 8, 1952 |